(12) United States Patent
Deker et al.

(10) Patent No.: US 8,352,102 B2
(45) Date of Patent: Jan. 8, 2013

(54) INTERACTIVE NAVIGATION DEVICE

(75) Inventors: Guy Deker, Cugnaux (FR); Emmanuel Roux, Leguevin (FR)

(73) Assignee: Thales, Neuilly sur Seine (FR)

( * ) Notice: Subject to any disclaimer, the term of this patent is extended or adjusted under 35 U.S.C. 154(b) by 474 days.

(21) Appl. No.: 12/732,516

(22) Filed: Mar. 26, 2010

(65) Prior Publication Data

US 2010/0250026 A1 Sep. 30, 2010

(30) Foreign Application Priority Data

Mar. 27, 2009 (FR) ...................................... 09 01509

(51) Int. Cl.
*G01C 23/00* (2006.01)
(52) U.S. Cl. ............................ 701/14; 701/431; 701/454
(58) Field of Classification Search .................. 701/3, 4, 701/5, 8, 13, 14, 120, 122, 408, 410, 409, 701/411, 431, 454; 340/971, 972, 973, 979
See application file for complete search history.

(56) References Cited

U.S. PATENT DOCUMENTS

| | | | |
|---|---|---|---|
| 6,922,631 B1 | 7/2005 | Dwyer et al. | |
| 7,698,027 B2 * | 4/2010 | Caillaud | ........................ 701/14 |
| 7,966,122 B2 * | 6/2011 | Flynn et al. | .................... 701/528 |
| 8,090,531 B2 * | 1/2012 | Goutelard et al. | ............ 701/466 |
| 2008/0027629 A1 | 1/2008 | Peyrucain et al. | |

FOREIGN PATENT DOCUMENTS

FR 2 904 461 A1 2/2008

OTHER PUBLICATIONS

Engel K R: "The tactical aircraft moving 1-20 map capability (TAM-MAC)" Digital Avionics Systems Conference, 1999. Proceedings. 18TH St Louis, MO, USA Oct. 24-29, 1999, Piscataway, NJ, USA,I, US, vol. C.2-7 vol. 1, Oct. 24, 1999, pp. 4.B.5-1, XP010501214.

* cited by examiner

*Primary Examiner* — Richard M. Camby
(74) *Attorney, Agent, or Firm* — Baker & Hostetler LLP

(57) ABSTRACT

The subject of the invention is an interactive navigation device comprising at least one navigation screen making it possible to display a graphical representation of at least one flight plan, a flight plan being composed of points and of segments. The device comprises means for displaying several flight plans simultaneously on the navigation screen at the same time as flight information text fields associated with the points of the said flight plans, the flight information fields being displayed in a manner contiguous with the points associated with them so as to be able to compare them conveniently. The device also comprises means for displaying on the navigation screen flight information fields associated with the segments of the flight plans, the said flight information fields being displayed in a manner contiguous with the segments associated with them.

19 Claims, 5 Drawing Sheets

18600 — / 180

F183 190 / 160 though, the quantity of fuel on board, the temperature, the wind as well as time constraints imposed by the ATC air traffic control bodies: required departure and/or arrival time slot.

INTERACTIVE NAVIGATION DEVICE

CROSS-REFERENCE TO RELATED APPLICATIONS

This application claims priority to foreign France patent application No. 0901509, filed on Mar. 27, 2009, the disclosure of which is hereby incorporated by reference in its entirety.

FIELD OF THE INVENTION

The present invention relates to aircraft flight management systems, designated by the acronym FMS, and more particularly an interactive device for displaying flight plans.

BACKGROUND OF THE INVENTION

FMS flight management systems are well known. They make it possible to formulate the flight plan of an aircraft on each mission, by taking account of parameters specific to the aircraft and to the flight conditions such as the payload, the weight of the aircraft, the quantity of fuel on board, the temperature, the wind as well as time constraints imposed by the ATC air traffic control bodies: required departure and/or arrival time slot.

The flight plan describes notably the set of points ("waypoints") or positions above which the aircraft must pass, with notably the corresponding altitude and speed at each point. It provides a vertical flight profile for the various phases of the aircraft, typically the climb phase CLB, the cruising phase CRZ and the descent phase DES.

Several types of flight plan are considered by FMS systems. The pilot usually has at his disposal an active flight plan, a temporary flight plan and one or more secondary flight plan(s).

The active flight plan is the flight plan currently undergoing processing and the latter controls the aircraft's automatic pilot.

The temporary flight plan is a copy of the active flight plan to which modifications are made by the pilot, such as for example point or turning point addition or modification. This flight plan can thereafter become the active flight plan when the pilot so decides.

The secondary flight plan is a stored flight plan that may be selected as active flight plan by decision of the pilot.

In the current realizations, the information relating to these various flight plans is displayed in the aircraft flight deck by using two screens. A first screen, usually called the horizontal navigation screen, and designated by the acronym ND standing for the expression "Navigation Display", makes it possible to graphically display the active, temporary, and/or secondary flight plans, projected horizontally on the terrestrial surface with the names ("ident") of the points of the flight plan. A second screen, called the control and display unit, or else Pilot FM interface, and usually designated by the acronym CDU standing for the expression "Control Display Unit", serves as interface for displaying and editing each flight plan, comprising notably the list of points of the flight plan with their predictions of time, altitude, speed, fuel and wind and with the parameters between the points (name of route or procedure, distance, angle of route, etc.). The pilot can, with the aid of this interface, make modifications to each of the flight plans.

These screens are distinct and therefore display information in two different places. For example, the horizontal navigation screen ND can be in the head-level position whereas the control and display unit can be in the head-down position. When the pilot makes modifications to the temporary flight plan, it is then difficult to follow on two different screens the alterations in the trajectory and predictions associated with the points of the trajectory and therefore to be able to easily compare the active reference flight plan and the temporary flight plan.

SUMMARY OF THE INVENTION

An aim of the invention is notably to alleviate the aforesaid drawbacks.

For this purpose the subject of the invention is an interactive navigation device comprising at least one navigation screen making it possible to display a graphical representation of at least one flight plan, a flight plan being composed of points and of segments. The said device comprises means for displaying several flight plans simultaneously on at least one navigation screen at the same time as flight information text fields associated with the points of the said flight plans, the flight information fields being displayed in a manner contiguous with the points associated with them.

According to an aspect of the invention, the device comprises means for displaying on the navigation screen flight information fields associated with the segments of the flight plans, the said flight information fields being displayed in a manner contiguous with the segments associated with them.

According to another aspect of the invention, the device comprises a screen making it possible to display the vertical profile of one or more flight plans simultaneously according to two axes, altitude and distance. Flight information fields associated with the points of the said flight plans are, for example, displayed in a manner contiguous with the said points.

Flight information fields associated with the segments of the flight plans can be displayed in a manner contiguous with the said segments.

According to an embodiment, the active flight plan and at least one temporary flight plan are displayed on the navigation screen.

According to another embodiment, the active flight plan and at least one secondary flight plan are displayed on the navigation screen.

According to another embodiment, the active flight plan, at least one temporary flight plan and at least one secondary flight plan are displayed on the navigation screen.

In a mode of implementation, the device according to the invention comprises a control and display unit making it possible to display a list of points and/or of segments belonging to at least one flight plan and a man-machine interface making it possible to modify the said list.

The flight plan displayed by the control screen is, for example, an active flight plan, a temporary flight plan or a secondary flight plan.

The number of flight information fields to be displayed and their type can be selected by the user of the device with the aid of line keys making it possible to access on the control and display unit at least one page or one menu of display options and to select the display of one or more flight information fields.

In a mode of implementation, the control and display unit is a touch screen and the number of flight information fields to be displayed and their type are selected with the aid of at least one page or one display option menu and to select the display of one or more flight information fields.

According to an aspect of the invention, the selection of the display of one or more flight information fields of the same type is carried out by virtue of dialogue boxes appearing on the navigation screen and controlled on the basis of a selection ball and of at least one associated button.

According to another aspect of the invention, the flight information fields associated with the points of a flight plan comprise various types of flight information, including: a predicted timetable, a predicted altitude, a predicted quantity of fuel remaining, a prediction of the heading and of the strength of the wind, an altitude constraint, a speed constraint or a time constraint.

The flight information fields associated with the segments of a flight plan comprise, for example, various types of flight information, including: the distance between the two extreme points of each segment, the name of the procedure associated with the said segments and the angle of route between the two points.

In an embodiment, flight information fields contain relative information of a first flight plan with respect to a second flight plan.

The flight information fields can comprise information about comparison between a prediction and a constraint, a colour code making it possible to indicate whether or not the said constraint is complied with.

The overlapping of several flight information fields on a point or a segment corresponding to distinct flight plans is avoided, for example, by the introduction of a minimum distance to be complied with between the said fields as well as an orientation dependent on the position of each parent flight plan.

According to an embodiment, complementary information fields for comparison of the predictions on arrival of the flight plans appearing on the navigation screen are displayed at the bottom of the said screen.

According to another embodiment, the complementary information fields contain at least one field comprising predictions on arrival, including: the estimated arrival time, the quantity of fuel remaining on arrival and the remaining distance before arrival for each flight plan.

The complementary information fields are, for example, displayed with a different colour corresponding to each flight plan.

An advantage of the invention is notably to allow the displaying on the same screen of the trajectories and predictions associated with the points and with the segments of several flight plans. This makes it possible to associate visually and in a more ergonomic manner the trajectory and the predictions. Moreover, the invention allows the pilot to easily compare several flight plans and in particular a temporary flight plan with respect to the active flight plan.

BRIEF DESCRIPTION OF THE DRAWINGS

Other characteristics and advantages of the invention will become apparent with the aid of the description which follows given by way of non-limiting illustration, and in regard to the appended drawings among which.

MORE DETAILED DESCRIPTION

Figure 1:
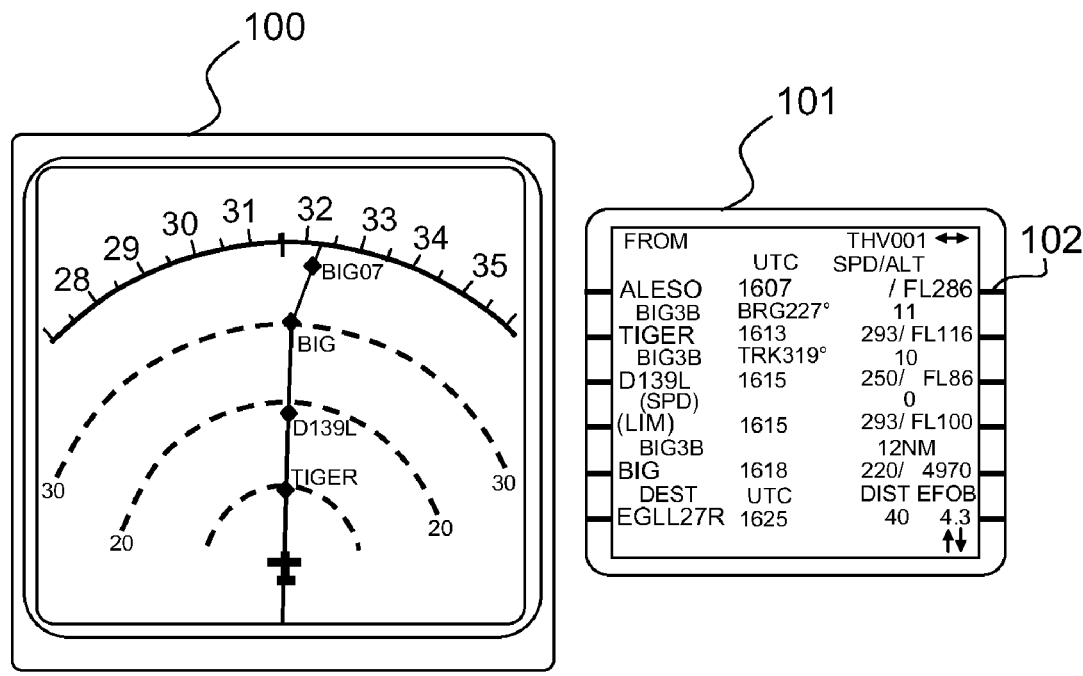
FIG. 1 presents an exemplary navigation screen and control screen.

FIG. 1 presents an exemplary navigation screen and control screen. The navigation screen 100 is used to graphically display the active flight plan. Several points appear whose identifiers are TIGER, D139L, BIG and BIG07. Flight information associated with each of these points appears. For example, for the point D139L, the forecast speed of 250 KT is indicated to the pilot, KT being an acronym standing for "knot", indicating the unit used.

Usually, two types of flight information can be displayed. The first is a set of state values in terms of position or speed, for example. The second type is a set of predicted values, that is to say values calculated by the FMS system.

On the second screen, that is to say the control screen, the list of points making up the temporary flight plan is displayed. In this example, the list corresponds to the list of points making up the active flight plan. Thus, the points TIGER, D139L and BIG appear there. Predictions on arrival are also displayed. Thus, arrival at the level of the last point of the flight plan is forecast at 16:25 and the aircraft is at a distance along the flight plan of 40 nautical miles from the said point.

Usually, the complete list of points of the flight plan is accessible by scrolling the list, for example with the aid of buttons corresponding to scrolling arrows. The point LIM between parentheses and not appearing on the horizontal navigation screen is a pseudo-point calculated at the altitude at which, for example, a speed restriction applies below this altitude. In the example of the figure, the said pseudo-point appears only on the control and display unit.

By interacting with an interface associated with the control screen, the pilot has the possibility of adding or deleting points. This interaction can be implemented, for example, with the aid of line keys 102. In the current display devices, these modifications appear only on the control and display unit and not on the navigation screen.

Figure 2:
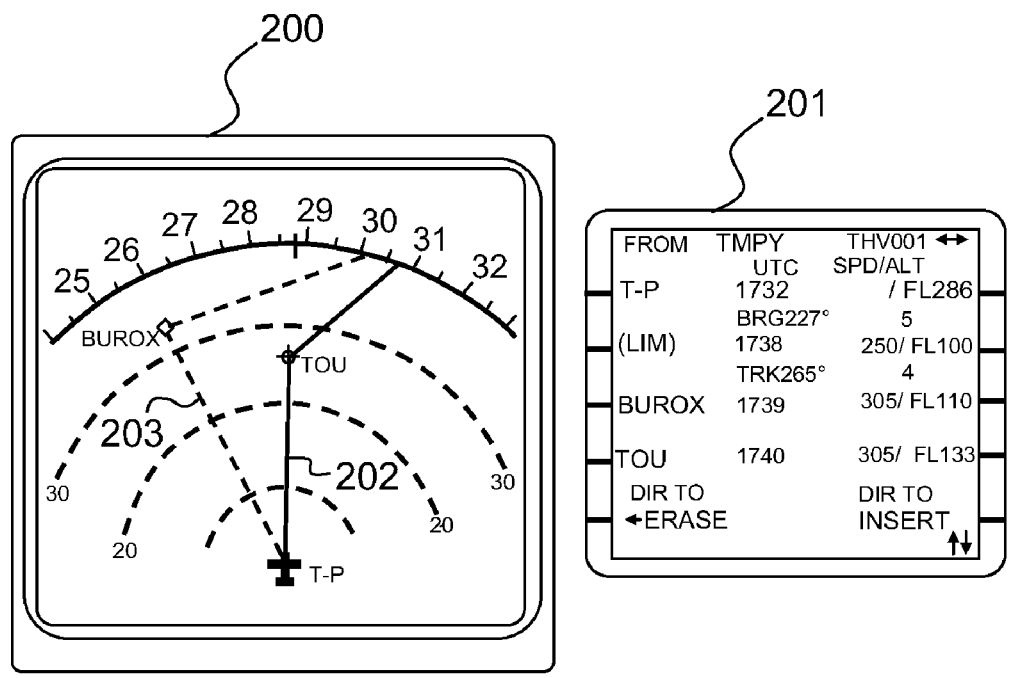
FIG. 2 presents a second exemplary navigation screen and control screen.

FIG. 2 presents a second exemplary navigation screen and control screen. The display device comprises at least one navigation screen 200 and one control screen 201. Several flight plans can be displayed simultaneously on the navigation screen. In the example of FIG. 2, the active flight plan 202 and a temporary flight plan 203 are displayed. Two points of the active flight plan appear on the navigation screen and have identifiers T-P and TOU. The latter appear in the temporary flight plan displayed on the control and display unit 201. In this example, the pilot has added an additional point called BUROX. The display device according to the invention makes it possible to display the said point simultaneously on the navigation screen.

Other possibilities of display are possible within the framework of the invention. For example, the secondary flight plan can also be displayed in parallel with the active flight plan and the temporary flight plan. Stated otherwise, the interactive display device can be configured by its user and thus select the flight plans to be displayed on each navigation screen.

The device according to the invention makes it possible to display on the navigation screen and in a manner contiguous with each point or pseudo-point flight information fields. The flight information presented in these fields is, for example, predictions such as a time, an altitude, a speed, a quantity of fuel and information relating to the wind. Moreover, for several distinct flight plans, flight information fields can indicate differences, that is to say relative information of a first flight plan with respect to a second flight plan. For example, if a first flight plan and a second have a point in common, the predicted time difference can be displayed. If the first flight plan indicates an arrival at 12:32 at the said point and the second at 12:25, the difference equal to −7 minutes can be displayed.

Moreover, flight information fields specific to the segments can be displayed. A segment appears as a straight or curved portion linking two successive points of a given flight plan. A segment is usually designated by the word "leg". The flight information fields are displayed in a manner contiguous with the segment and are, for example, the distance between the two points, an air route name or a procedure name.

The trajectory and the position of at least one aircraft selected by the pilot can also be displayed. This possibility is useful notably within the framework of manoeuvres for spacing with respect to this other aircraft.

Figure 3:
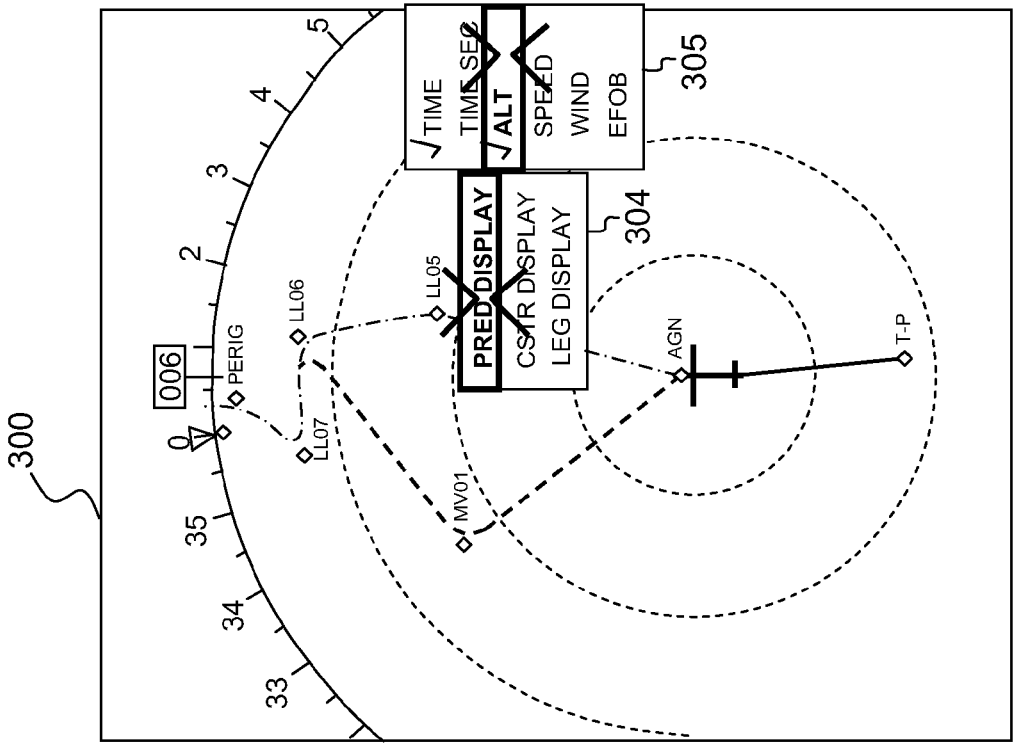
FIG. 3 gives an exemplary mode of configuration of the device according to the invention.
Figure 3:
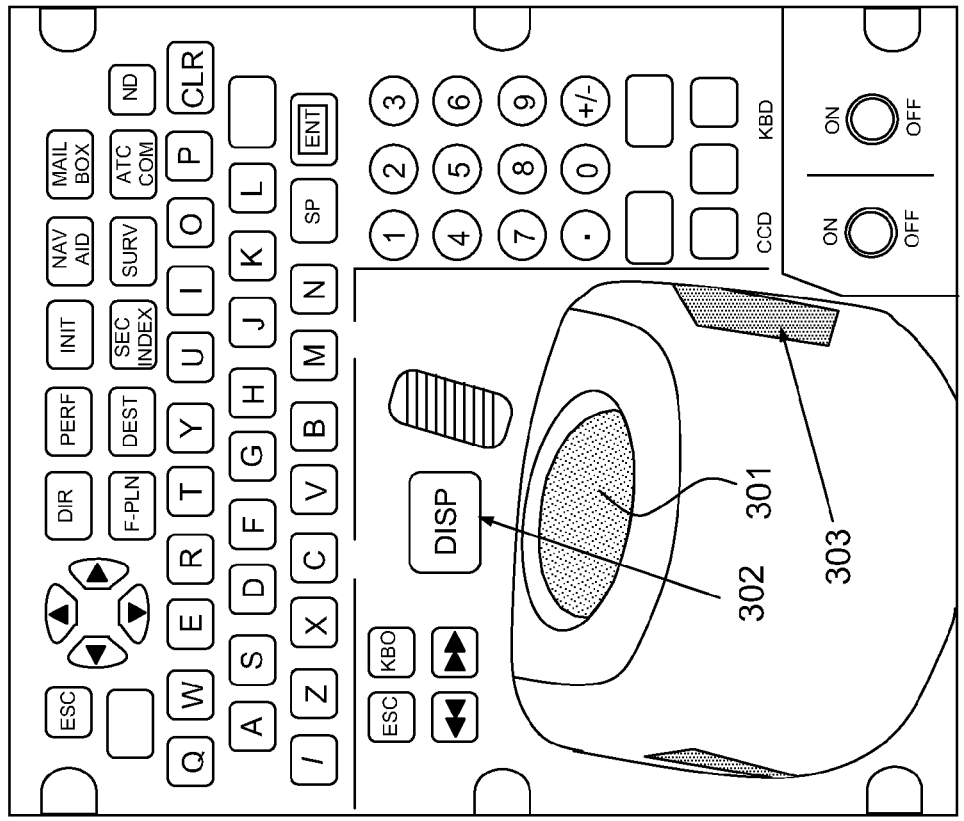

FIG. 3 gives an exemplary mode of configuration of the device according to the invention. In order not to clutter the navigation screen, the display of the flight information fields associated with the various flight plans can be configured according to the pilot's requirements.

The flight information fields associated with the points for which display on the navigation screen can be selected are, for example, short-term trajectories of other aircraft, time, speed, altitude, quantity of remaining fuel, heading and strength of the wind, altitude constraints, speed constraints and time constraints.

The flight information fields associated with the segments for which display on the navigation screen can be selected contain, for example, information such as the distance and the angle of route or of heading between two points and the name of the associated flight procedure. This information regarding angle of route or of heading corresponds to:

a constant heading of the aircraft not taking account of the drift of the wind and therefore by nature floating, the said angle usually being designated by the word "heading";

an aircraft route following a heading corrected for constant wind on the planisphere usually called rhumb line or "course";

an aircraft route following the shortest distance between two points on the earth and usually called great circle or "track".

On the navigation screen 300 of the example of the figure are displayed two flight plans. The first is the active flight plan and the second is a temporary flight plan. The pilot can, with the aid of a man-machine interface MMI, choose display options.

For example, the options can be chosen with the aid of a selection device such as a selection ball 301. The pilot clicks, for example, on a selection button 302, and a configuration menu makes it possible to choose which flight information fields are to be displayed at the points of the flight plans. In the example, the user can access a sub-menu making it possible to select with the aid of the selection ball 301 a sub-group of options. The menus and sub-menus appear, for example, in dialogue boxes 304, 305. The selection ball makes it possible to move around in the sub-menu and the user can thus select the display of lists of the various possible flight information fields associated with the points or with the segments and then select those that he wishes to see appear on the navigation screen. The selection ball 301 makes it possible to move around in the menus 304 and clicking a selection button 303 makes it possible to display the sub-menus 305. Each sub-menu 305 prompts selection or cancellation of the selection of the display of a given item of flight information. In the example of the figure, the user has chosen to display time and altitude predictions associated with the said points.

Other embodiments also make it possible to configure and to select the type of flight information fields to be displayed on the navigation screen. The control and display unit can be surrounded by line keys allowing the pilot to interact with the device and to configure the flight plan. For example, several pages of options can be created and called up on selecting a visible field on the control screen. The choice of the display option is made thereafter by firstly calling up the page concerned by pressing, for example, on a line key contiguous with the desired page. Selection or cancellation of the selection of the option to be displayed is done by pressing the line key contiguous with the desired field.

It is also possible, during the design of the system, to choose to use a touch control screen. In this case, the user can interact with the device by selecting various menus and sub-menus directly on the screen allowing him to select the display of this or that parameter.

Figure 4:
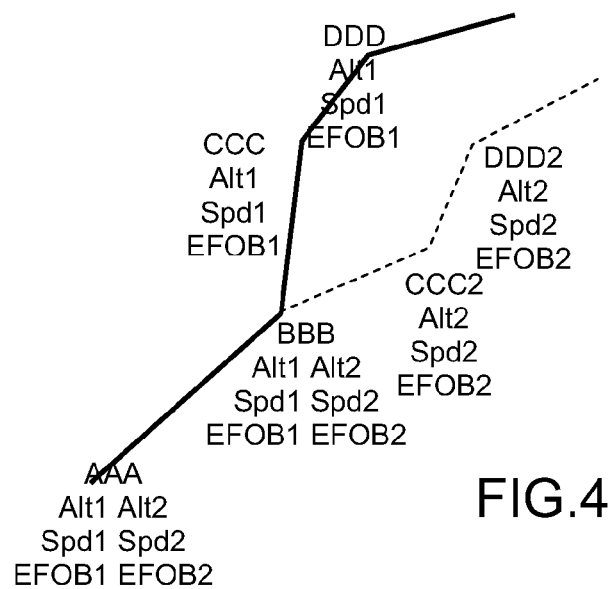
FIG. 4 illustrates a mode of simultaneous display of several flight plans.

FIG. 4 illustrates a mode of simultaneous display of several flight plans. When several flight plans or profiles are displayed on the navigation screen, it is possible for several information fields to overlap and consequently, the readability of the said fields is made difficult. In order to avoid the overlapping of the fields, for example a field for the active flight plan merging with a field for the temporary flight plan, the latter can be displayed with a logic of minimum separation with respect to the trajectory or profile.

This logic may be implemented, for example, by creating at least one parameter associated with the point, the said parameter being a position relating to another flight plan. For example, if the trajectory of the temporary flight plan diverges to the left of that of the active flight plan, then the predictions of the points of the temporary flight plan will be positioned under each point on the left and the predictions of the points of the active flight plan will be positioned under each point on the right.

Moreover, when points are common to two flight plans, the identifier of each of the said points is displayed only once, and the associated parameters of the temporary flight plan and of the active flight plan are displayed one alongside the other. In the example of the figure, a flight plan is composed of the points AAA, BBB, CCC, and DDD. A second flight plan consists of the points AAA, BBB, CCC2 and DDD2. The identification of the points AAA and BBB is common to the two flight plans. Consequently, the identifier of the point is displayed only once. The flight information fields associated with the points AAA and BBB are displayed side by side.

Moreover, the flight information fields can allow the positioning of a prediction with respect to a constraint. A colour code can be chosen to indicate whether or not the said constraint is complied with.

Figure 5:
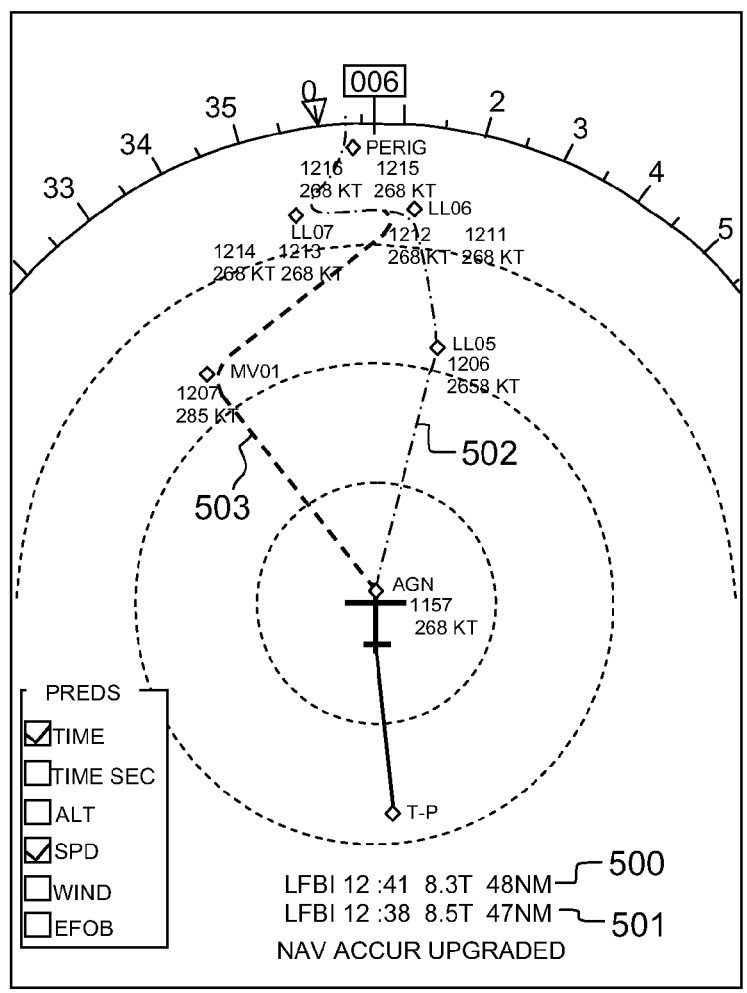
FIG. 5 illustrates a mode of display comprising complementary information fields.

FIG. 5 illustrates a mode of display comprising complementary information fields. Information fields complementary to those associated with the points and with the segments of the flight plans displayed, such as for example predictions at destination, can be displayed at the bottom of the navigation screen. This information recalls, for example, for each flight plan, the arrival airport, the estimated arrival time, the quantity of fuel remaining, the remaining distance expressed in nautical miles NM. These messages can be displayed with a colour specific to each flight plan. The arrival airport is identified, for example, with the aid of a code of the ICAO international civilian aviation organization. The example of FIG. 5 indicates an arrival airport identified by the code LFBI designating the French airport of Poitiers-Biard.

In the example of the figure, two flight plans are displayed on the navigation screen. The first is the active flight plan 502 and the second is the temporary flight plan 503. These flight plans each appear with their own specific colour, for example green for the active flight plan and yellow for the temporary flight plan. The user has chosen that the time and the speed (SPD) associated with each point be displayed. For the points common to the two flight plans, and as indicated previously with the aid of FIG. 4, the identifier is displayed once and two sets of predictions are displayed below the said identifier. Thus, for the LL06, the predicted timetable is 12:12 for the temporary flight plan 503 and 12:11 for the active flight plan 502.

The complementary information fields, that is to say the forecasts at destination for the flight plans presented, are displayed at the bottom of the screen. The forecasts at destination of the active flight plan 501 are then displayed for example in green and the forecasts at destination of the temporary flight plan 500 are displayed for example in yellow.

Clearly displayed information is thus at the disposal of the pilot, allowing him to make faster decisions.

In addition to the forecasts at destination, it is possible to display control messages at the bottom of the screen. In the example of FIG. 5, the message "NAV ACCUR UPGRADED" is displayed, indicating that the accuracy of navigation has improved.

Figure 6:
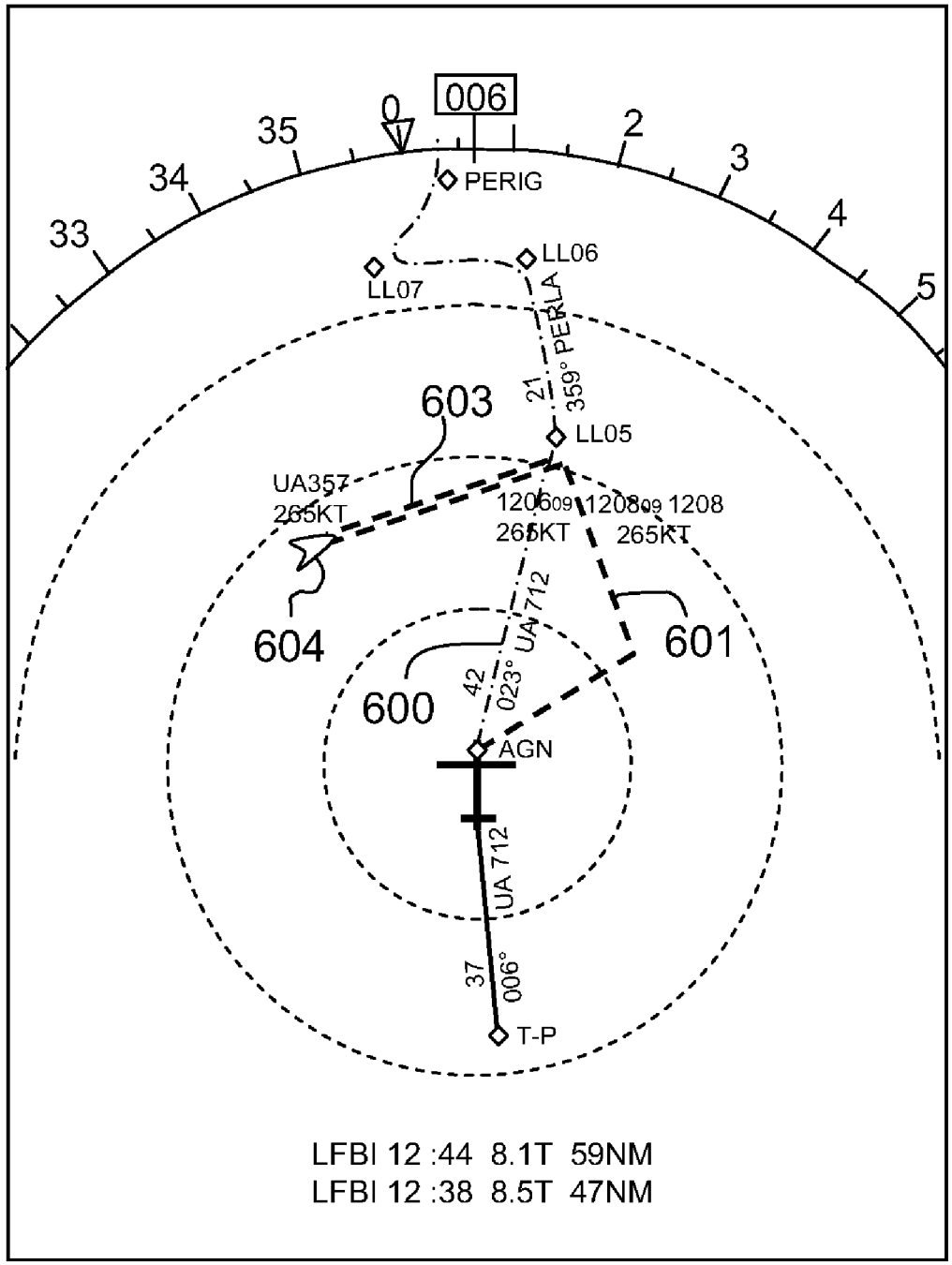
FIG. 6 gives an exemplary traffic screen.

FIG. 6 gives an exemplary traffic screen, usually designated by the expression "traffic display". This screen makes it possible to display several flight plans belonging to neighbouring aircraft. In the example of FIG. 6, in addition to the active flight plan 600 and temporary flight plan 601 of the aircraft comprising the device, an active flight plan 603 of a neighbouring aircraft 604 is displayed. The device according to the invention makes it possible to compare the information of the three flight plans displayed. Thus, if the temporary flight plan 601 becomes the active flight plan, the piloted aircraft and its neighbours 604 will both arrive at 12:08 at the point LL05 whereas the piloted aircraft would arrive at 12:06, i.e. two minutes before the neighbouring aircraft, if the active plane is not modified.

Moreover, the user has chosen to display fields associated with the segments. For example, on the segment between the points T-P and AGN, three fields appear 30, 006° and UA 712 corresponding respectively to the distance, the angle of route and the name of the air route.

The traffic screen can, according to the implementations, be a distinct screen different from the navigation screen or else a mode of operation of the navigation screen.

Figures 7, 8, 9:
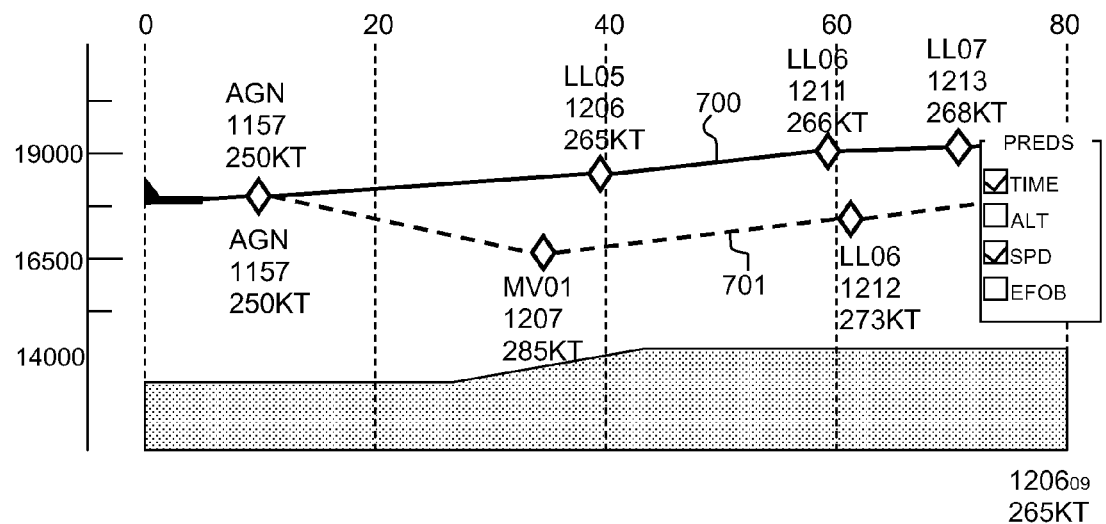
FIG. 7 gives an exemplary navigation screen in vertical mode.
FIGS. 8 and 9 give examples of modes of display for the predictions associated with the flight plans.

FIG. 7 gives an exemplary vertical screen also called a "Vertical Display". The same principle as that described for the display on the navigation screen is used.

Several flight plans can be displayed in parallel. Flight information fields associated with the points and with the segments can also be displayed by following the principles of the invention such as were described previously.

For example, flight information fields associated with each point or pseudo-point are displayed on the screen in a manner contiguous with each point or pseudo-point. The information contained in these fields is, for example predictions of time, of altitude, of speed, of fuel or of wind.

With regard to the segments, flight information fields are displayed, when the pilot so wishes, on the screen in a manner contiguous with the segment linking two successive points. Such is, for example, the vertical parameters of the segment, such as the slope constraints FPA, the acronym standing for the expression "Flight Path Angle", or the type of approach.

These fields are displayed for each flight plan, be it active, secondary or temporary. The type and the number of flight information fields to be displayed is selected by the pilot, by using for example one of the schemes described previously. The pilot can also choose to display the terrain cross-section along the active flight plan. This makes it possible to compare the vertical profile of each flight plan in relation to the altitude and distance axes.

In the example of the figure, the active flight plan 700 and a temporary flight plan 701 are displayed. The altitude is given as ordinate and the distance as abscissa. Four points of the active flight plan are displayed on the navigation screen, namely AGN, LL05, LL06 and LL07. Three points of the temporary flight plan are displayed AGN, MV01 and LL06. The pilot has chosen to bring up the time forecast and speed forecast for each point. For example, the FMS system predicts that the aircraft will pass level with the point LL05 of the active flight plan at 12:06 with a speed of 265 KT.

FIGS. 8 and 9 give examples of mode of display for the predictions associated with the flight plans.

It is possible to use a simplified mode of display of the parameters so as notably to limit the clutter on the screen. The speed can be expressed either in Mach by using a display format of the type MXX for a speed of Mach XX, or in CAS by using a display format of the type XXXKT for a speed of XXX knots for example.

The altitude can be displayed by using the format FLXXX indicating the flight level as standard, either by using the format XXX indicating the altitude in feet QNH, pressure reference indicating the altitude with respect to the mean sea level, or by using the format hXXX (h for "height") indicating the height in feet QFE, pressure reference indicating the 0 altitude at the terrain level.

The predictions can be displayed so as to position them with respect to a constraint value. Moreover, colour codes can be used to indicate whether the said constraint is satisfied or not satisfied.

For example, for a prediction of 18600 feet QNH with the constraint that the altitude is greater than or equal to 18000 feet QNH "made", it may be displayed in the following manner:

$$18600 > 180\,00,$$

the last 2 digits being displayed in a smaller font to signify that they have no significant value.

FIG. 8 illustrates another way of displaying this information. A line is positioned straight ahead of the prediction value displayed, and the value of the constraint is displayed under this line if it is a minimum constraint (constraint termed "at or above"), or on this line if it is a maximum constraint (constraint termed "at or below").

The fact that the constraint is satisfied can be highlighted by choosing a colour code indicating the position of the prediction with respect to the constraint. For example, the prediction value 18600 can be displayed for example in magenta, this colour indicating that the constraint is satisfied and controlled by the flight management system.

When a constraint is not satisfied, another display format can be implemented. For a prediction of 18600 feet QNH with the constraint that the altitude is greater than or equal to 18000 feet QNH, the display can take one of the following forms:

$$18600 = 180\,00 \text{ or } 18600\ 180\,00 =$$

The prediction value 18600 can be displayed for example in the colour amber, this colour indicating that the constraint normally managed by the flight management system is not satisfied.

For a prediction of 18300 feet at standard pressure 1013 and a constraint window defined between 16000 and 19000 feet QNH, the display can take the following form:

16000 <FL183<19000 it also being possible for FL183 to be written F183. The initials FL refer to the expression "Flight Level". The associated value is defined at standard pressure. FIG. 9 presents a different way of displaying an altitude prediction at the standard pressure 1013 associated with its constraint. The prediction is placed straight ahead of a line. Above and below the said line are respectively placed the top and bottom limits of the constraint window.

What is claimed is:

1. An interactive navigation device comprising at least one navigation screen making it possible to display a graphical representation of at least one flight plan, a flight plan being composed of points and of segments, said device comprising means for displaying several flight plans simultaneously on the navigation screen at the same time as flight information text fields associated with the points of the said flight plans, the flight information fields being displayed in a manner contiguous with the points associated with them, and in that it comprises means for displaying on the navigation screen flight information fields associated with the segments of the flight plans, the said flight information fields being displayed in a manner contiguous with the segments associated with them.

2. A device according to claim 1, further comprising a screen making it possible to display the vertical profile of one or more flight plans simultaneously according to two axes, altitude and distance, and in that flight information fields associated with the points of the said flight plans are displayed in a manner contiguous with the said points.

3. A device according to claim 2, wherein flight information fields associated with the segments of the flight plans are displayed in a manner contiguous with the said segments.

4. A device according to claim 1, wherein the active flight plan and at least one temporary flight plan (203) are displayed on the navigation screen.

5. A device according to claim 1, wherein the active flight plan and at least one secondary flight plan are displayed on the navigation screen.

6. A device according to claim 1, wherein the active flight plan, at least one temporary flight plan and at least one secondary flight plan are displayed on the navigation screen.

7. A device according to claim 1, wherein it comprises a control and display unit making it possible to display a list of points and/or of segments belonging to at least one flight plan and a man-machine interface making it possible to modify the said list.

8. A device according to claim 7, wherein the flight plan displayed by the control and display unit is an active flight plan, a temporary flight plan or a secondary flight plan.

9. A device according to claim 7, wherein the number of flight information fields to be displayed and their type is selected by the user of the device with the aid of line keys making it possible to access on the control and display unit at least one page or one menu of display options and to select the display of one or more flight information fields.

10. A device according to claim 7, wherein the control and display unit is a touch screen and in that the number of flight information fields to be displayed and their type are selected with the aid of at least one page or one display option menu and to select the display of one or more flight information fields.

11. A device according to claim 1, wherein the selection of the display of one or more flight information fields of the same type is carried out by virtue of dialogue boxes appearing on the navigation screen and controlled on the basis of a selection ball and of at least one associated button.

12. A device according to claim 1, wherein the flight information fields associated with the points of a flight plan comprise various types of flight information, including: a predicted timetable, a predicted altitude, a predicted quantity of fuel remaining, a prediction of the heading and of the strength of the wind, an altitude constraint, a speed constraint or a time constraint.

13. A device according to claim 1, wherein the flight information fields associated with the segments of a flight plan comprise various types of flight information, including: the distance between the two extreme points of each segment, the name of the procedure associated with the said segments and the angle of route between the two points.

14. A device according to claim 1, wherein flight information fields contain relative information of a first flight plan with respect to a second flight plan.

15. A device according to claim 1, wherein the flight information fields comprise information about comparison between a prediction and a constraint, a colour code making it possible to indicate whether or not the said constraint is complied with.

16. A device according to claim 1, wherein several flight information fields on a point or a segment corresponding to distinct flight plans is avoided by the introduction of a minimum distance to be complied with between the said fields as well as an orientation dependent on the position of each parent flight plan.

17. A device according to claim 1, wherein complementary information fields for comparison of the predictions on arrival of the flight plans appearing on the navigation screen are displayed at the bottom of the said screen.

18. A device according to claim 17, wherein the complementary information fields contain at least one field comprising predictions on arrival, including: the estimated arrival time, the quantity of fuel remaining on arrival and the remaining distance before arrival for each flight plan.

19. A device according to claim 17, wherein the complementary information fields are displayed with a different colour corresponding to each flight plan.

* * * * *